United States Patent [19]

Yamamori et al.

[11] Patent Number: 4,499,223

[45] Date of Patent: Feb. 12, 1985

[54] HYDROLYZABLE POLYESTER RESINS AND COATING COMPOSITIONS CONTAINING THE SAME

[75] Inventors: Naoki Yamamori, Osaka; Junji Yokoi; Motoyoshi Yoshikawa, both of Nara, all of Japan

[73] Assignee: Nippon Paint Co., Ltd., Osaka, Japan

[21] Appl. No.: 602,722

[22] Filed: Apr. 23, 1984

Related U.S. Application Data

[63] Continuation-in-part of Ser. No. 426,155, Sep. 28, 1982.

[51] Int. Cl.$^3$ .............................................. C08G 63/02
[52] U.S. Cl. .................................. 524/176; 523/124; 524/178; 524/201; 524/413; 524/440; 528/295.5; 528/302; 528/303; 528/304; 528/305
[58] Field of Search .............. 524/176, 178, 201, 413, 524/440; 528/295.5, 296, 302, 303, 304, 305; 523/124; 260/DIG. 43

[56] References Cited

U.S. PATENT DOCUMENTS

| | | | |
|---|---|---|---|
| 2,985,624 | 5/1961 | Arndt | 528/302 |
| 3,053,783 | 9/1962 | Broadhead et al. | 528/296 |
| 3,075,936 | 1/1963 | Bolton | 528/296 |
| 3,761,450 | 9/1973 | Herwig et al. | 528/296 |
| 4,277,392 | 7/1981 | Feldman et al. | 525/447 |

Primary Examiner—Maurice J. Welsh
Attorney, Agent, or Firm—Wenderoth, Lind & Ponack

[57] ABSTRACT

Hydrolyzable polyester resin for an antifouling paint use having at least one metal-ester bondings, the metal being at least one member selected from the Groups Ib, IVa and VIII of the Periodic Table and the metal content being 0.3~10 wt %. The polyester resin is useful as resinous vehicle in self-polishing marine paint.

4 Claims, No Drawings

HYDROLYZABLE POLYESTER RESINS AND COATING COMPOSITIONS CONTAINING THE SAME

This is a continuation-in part of Ser. No. 426,155 filed on Sept. 28, 1982.

FIELD OF INVENTION

The present invention relates to hydrolyzable polyester resins and coating compositions containing the same.

BACKGROUND OF THE INVENTION

Polyester resins derived from polycarboxylic acids and polyhydric alcohols have been widely used as resinous vehicle in coatings, because an excellent film with toughness and other desirable properties can be obtained therefrom. Irrespective of the polymerization degree, the ester bondings contained are resistive against hydrolysis, which in turn, is believed to be one of the reasons and advantages of using this polymer as resinous component.

In coatings, and especially in ship bottom paint, from the standview that if the coat whose surface is full of undulation is gradually hydrolyzed or dissolved in sea water during sailing, thereby resulting a comparatively flat bottom surface, fuel cost would be greatly economized and furthermore, the tendency for the sea livings as acorn shell or the like to stick to the bottom of ship would be, from the nature of things, greatly reduced, hydrolyzable resinous materials have become the object of public attention of late years. However, very unfortunately, attempts at achieving such polyester material have all ended in failure partly due to the conflicting requirements of moderate stability and gradual decomposition of the material in sea water. Polyester is, as is well known, composed of water soluble polyhydric alcohol and polycarboxylic acid which is also relatively soluble in water due to the presence of polar carboxyl groups. Therefore, if some thing is devised to decompose said polymer into lower molecular segments or it constitutional components in an appropriate rate, then the so-called self-polishing would be realized with this material. The inventors, having the above in mind, have made endeavors to get polyester which is relatively stable in water, but is decomposed or hydrolyzed gradually under sailing conditions. Surprisingly, it was found that in the preparation of polyester by the polycondensation of polycarboxylic acid and polyhydric alcohol components, if a polyhydric alcohol having the metal ester bonding of the formula:

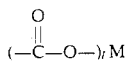

wherein M stands for metallic element and l is an integer corresponding to the valency of said metal M, is used as at least part of said polyhydric alcohol component, a number of said metal-ester bondings can be introduced into the polyester chain, and thus obtained polyester is very stable against hydrolysis under neutral condition, but is gradually decomposed and hydrolyzed under weak alkaline conditions, at the sites of said metal-ester bondings, thereby liberating metal ions and giving water soluble segments with carboxyl groups. Sea water and sailing will offer optimum hydrolysis conditions to this polymer. On the basis of these findings, the inventors have completed the invention.

SUMMARY OF THE INVENTION

The invention provides a hydrolyzable polyester resin for a marin paint use having at least one metal-ester bondings, the metal being selected from the Groups Ib, IVa and VIII of the Periodic Table, and an antifouling paint composition comprising the abovesaid hydrolyzable polyester resin and antifouling agent. More specifically, the metal is selectedfrom Cu, Ni and Sn and the polyeser is characterized by having a hydrolysis rate at 40° C. in an alkaline solution (pH 10) of $10 \sim 300$ μg/cm² day and the metal content of $0.3 \sim 10$ wt.%.

DESCRIPTION OF THE PREFERRED EMBODIMENTS

The present polyester resin is, as already stated, characterized by having at least one metal-ester bondings, the metal being at least one member selected from the Groups Ib, IVa and VIII of the Periodic Table, as Cu, Ni and Sn and being hydrolyzed in a weak alkaline atmosphere as in sea water in an appropriate rate, e.g. $10 \sim 350$ μ/year.

Such polyester resin may be advantageously prepared by the reaction of polycarboxylic acid and polyhydric alcohol, a part of which is a metallic salt of hydroxy carboxylic acid of the formula (I):

wherein R is a hydrocarbon residue; M stands for metal belonging to Groups Ib, IVa and VIII of the Periodic Table; and l is an integer corresponding to the valency of said metal M.

Examples of such acids are straight chain dicarboxylic acids as oxalic acid, succinic acid, succinic anhydride, adipic acid, azelaic acid and sebasic acid; aromatic acids as phthalic acid, phthalic anhydride, isophthalic acid, terephthalic acid, terephthalic anhydride, hexahydro phthalic acid, hexahydrophthalic anhydride, tetrabromophthalic anhydride, trimellitic acid, trimellitic anhydride, pyromellitic acid and pyromellitic anhydride; and unsaturated dicarboxylic acids as maleic acid, maleic anhydride, fumaric acid and itaconic acid. If desired, monocarboxylic acid as benzoic acid, p-t-butyl benzoic acid, and various fatty acids of animal and vegetable fats and oils may be added as molecular regulator.

The metal salts of hydroxy acids to be reacted, as at least part of polyhydric alcohol component, with the abovesaid acid component may be represented by the formula (I)

wherein R, l and M are as defined above.

The hydrocarbon aresidue R may be of saturated or unsaturated, straight or branched, aliphatic or aromatic type.

More specifically, said hydrocarbon residue may take either one of the following forms.

(1) Saturated aliphatic hydrocarbon residue of the formula:

in which a is an integer from 1 to 38.

Among them, special preference is given to the subgroup members of the formula:

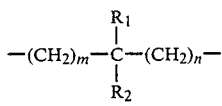

in which $R_1$ and $R_2$ each represents a member selected from hydrogen atom, alkyl having 1 to 10 carbon atoms and alkene having 2 to 10 carbon atoms, and m and n each is 0 or an integer from 1 to 16. Most preferably, said $R_1$ and $R_2$ each stands for hydrogen atom or alkyl having 1 to 8 carbon atoms, and m and n each is 0 or an integer from 1 to 10. Examples of hydroxy carboxylic acid of this type are lactic acid, hydacrylic acid, 12-hydroxy stearic acid and glycolic acid.

(2) Unsaturated aliphatic hydrocarbon residue of the formula:

$$-(C_bH_{2b-2})-$$

in which b is an integer from 2 to 38.

Among them, special preference is given to the subgroup members of the formula:

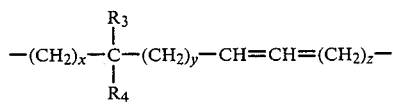

in which $R_3$ and $R_4$ each represents a member selected from hydrogen atom, alkyl having 1 to 10 carbon atoms and alkene having 2 to 10 carbon atoms, and x, y and z each is 0 or an integer from 1 to 10. Most preferably, said $R_3$ and $R_4$ each represents a member selected from hydrogen atom and alkyl having 1 to 8 carbon atoms, x is 0 or an integer from 1 to 4, y is 0 or an integer from 1 to 6 and z is 0 or an integer from 1 to 10. Examples of hydroxy carboxylic acids of this type are ricinoleic acid and ricinoelaidic acid.

(3) Residue of half ester of aliphatic dicarboxylic acid of the formula:

$$-R_5-O-\overset{\overset{O}{\|}}{C}-R_6-$$

in which $R_5$ is a member selected from alkylene having 1 to 8 carbon atoms and ether bonding bearing alkylene having 4 to 8 carbon atoms, and $R_6$ is a member selected from saturated and unsaturated alkylenes having 2 to 4 carbon atoms.

Examples of hydroxy carboxylic acids of this type are half esters of aliphatic dicarboxylic acids as maleic anhydride, succinic anhydride, dimethyl maleic anhydride, dimethyl succinic anhydride and the like, with polyols as ethylene glycol, propylene glycol, 1,3-butylenediol, 1,6-hexanediol, diethylene glycol, dipropylene glycol, neopentylglycol, triethyleneglycol and the like.

(4) Residue of half esters of aromatic dicarboxylic acid of the formula:

$$-R_7-O-\overset{\overset{O}{\|}}{C}-R_8-$$

in which $R_7$ is a member selected from alkylene having 2 to 8 carbon atoms and ether bonding bearing alkylene having 4 to 8 carbon atoms, and $R_8$ is a member selected from saturated and unsaturated cyclic hydrocarbons having 6 to 7 carbon atoms.

Examples of hydroxy carboxylic acids of this type are half esters of aromatic dicarboxylic acids as phthalic anhydride, tetrahydrophthalic anhydride, hexahydrophthalic anhydride, himic anhydride and the like, with polyols as ethylene glycol, propylene glycol, 1,3-butylenediol, 1,6-hexanediol, diethylene glycol dipropylene glycol, neopentyl glycol, triethylene glycol and the like.

From the economical and effectual stands of view, particularly preferred members are lactic acid, glycolic acid, hydracylic acid and 12-hydroxy stearic acid.

Most of these metallic salts of hydroxy carboxylic acids per se have been known and however, they can easily be prepared, as hereinafter stated, by the reaction of corresponding hydroxy carboxylic acid with oxide, hydroxide or carbonate of the desired metal.

Though the metal can be any one belonging to the abovesaid groups, it may, for the coating purpose, pareferably be selected from Cu, Ni and Sn. Of course, the invention can never be limitted to these members only, and any of the metallic salts of hydroxy carboxylic acids represented by the aforesaid formula may satisfactorily be used. As already stated, they are, singularly or in combination form, used as the whole or a part of the polyhydric alcohol component. When used, the polyhydric alcohols other than the said metallic salt of hydroxy carboxylic acid may be of any type customarily used for the preparation of polyester resin, including glycols as ethylene glycol, propylene glycol, 1,3-butylenediol, 1,6-hexanediol, diethyleneglycol, neopentyl glycol, dipropylene glycol and triethylene glycol; hydrogenated bisphenol A, bisphenol dihydroxy propyl ether, glycerol, trimethylol ethane, trimethylol propane, pentaerythritol and the like.

The polyester of the present invention can be advantageously prepared by reacting the abovesaid components in an adequate inert solvent, with or without catalyst, at an elevated temperature, while removing the formed water therefrom, and no particular technique or operation is needed in connection with the employment of said metallic salt. However, said metallic salts of hydroxy carboxylic acids are, in general, insoluble in ketones and aromatic solvents. Therefore, in a preferred embodiment, the metallic salt of hydroxy carboxylic acid is first added to the polycarboxylic acid and the mixture is heated while removing the formed water therefrom. When an acid anhydride is used, the mixture may be merely heated and fused together. At this time, in order to avoid local excessive heating, an aromatic solvent as toluene, xylene and the like may preferably be used and the heating is effected at around the melting point of said polycarboxylic acid. Next, a catalyst customarily used for the preparation of polyester as, for example, dibutylatin oxide or lithium naphtheneate, is added, with an optional polyol or a solvent, to the system and esterification is effected at an elevated temperature. At an excessibly higher temperature, there is a fear of the metallic salt of hydroxy carboxylic acid used being decomposed, and therefore, the reaction should be carried out at a temperature lower than the decomposition temperature of said metallic salt. Most of the abovementiond metallic salts of hydroxy carboxylic acids will be decomposed at around 200° C. and over, and hence the reaction should preferably be carried out at about 160° C. to 180° C. The actual temperature is to be selected in an optimum range depending on the type of metallic salt used.

The progress of polycondensation may be traced by checking the amount of water generated and the acid value of the product obtained. In order to obtain the polymer product for coating use, polymerization should preferably be stopped at a relatively earlier stage, thereby producing a lower molecular weight, solvent soluble type product. The degree of polycondensation, optimum molecular weight of the polymer, and control of said reaction are, however, patent to those skilled in the art and hence, no additional explanation would be required. Thus, the end point of the reaction is customarily determined by checking the amount of water generated, acid value of the product or the like, and after completion of the reaction, the mixture is diluted with an organic solvent as aromatic hydrocarbons (e.g. toluene, xylene), ketones (e.g. methylethylketone, methyl isobutyl ketone), esters (e.g. ethyleneglycol monoethyl ether acetate, butyl acetate, ethyl acetate), alcohols (e.g. n-butyl alcohol, isobutyl alcohol, sec-butyl alcohol), ethers (e.g. 1,4-dioxane, tetrahydrofuran) and mixtures thereof to the desired solid content and used as resinous vehicle or varnish as it is. With this method, it is also possible to prepare a hydrolyzable polyester resin having a relatively higher molecular weight, which is likewise useful for coating purpose. Therefore, the term "polyester resin" as used herein denotes both product with comparatively lower molecular weight, e.g. number-average molecular weight of about 500 to 10,000 which is particularly useful in coating composition (most preferably from 800a to 6000) and product with far higher molecular weight.

The polyester resin according to the present invention is, regardless of the polymerization degree thereof, characterized by having in the molecule a number of metal-ester bondings, which are inert to water under neutral condition but liable to be hydrolyzed under weak alkaline condition. Therefore, inclusion of such metal-ester bondings in the molecule may be carried out in different ways. In one method, a certain degree of polycondensation is first carried out with the polycarboxylic acid and polyhydric alcohol, and the desired amount of metallic salt of hydroxycarboxylic acid is added in later stage and esterification is further continued to obtain a hydrolyzable polyester resin. Alternatively, the present polyester resin may be obtained by reacting a polyester oligomer having a resinous acid value of 5~250 and an organic or inorganic metal compound, as a direct method. In this case, as the metal compound, use is made of, for example, organotin or metallic chlorides, oxides, hydroxides or hydroxide anhydrides. Depending on the reagents used, the actual structure of the present hydrolyzable polyester resins may somewhat vary, and however, they are distinguishable from others by the inclusion of metal-ester bondings in the molecule and the metal content as hereinafter stated.

As already stated, such metal-ester bonding is stable in neutral water but is liable to be hydrolyzed or decomposed under weak alkaline condition as in sea water. This hydrolysis rate, in other words solubilization rate, may very mainly with the nature and amount of the metal coantained. For example, at an equivalent concentration, the hydrolysis rates may vary with the metals as follows:

$$Cu > Sn > Ni > Zn > Mg > Ba > Ca$$

Thus, the hydrolysis is, in fact, inversely proportional to the ionization potential of metal.

The amount of metal-ester bondings is directly connected with the hydrolysis rate and the more the metallic content, the more the hydrolysis effect.

In the present invention, the polyester resin is intended to use as resinous vehicle in coating composition and especially in marin paint composition. Therefore, the coating should be, while offering a stable state under normal conditions, decomposed and hydrolyzed gradually in sea water. If the hydrolysis rate is too late, the intended object of attaining a smooth surface during sailing of the ship bottom might not be obtained and the expected antifouling effect would be deficient. On the other hand, if the hydrolysis rate is too fast, it cannot stand for as marine paint.

For the actual use intended, the coating should preferably be hydrolyzed or dissolved out at a rate of 10~350 μ/year and more preferably 20~250 μ/year. Thus in the present invention, the hydrolysis rate is the most important factor and the term "hydrolysis rate" as used herein denotes the speed whereby the coating is hydrolyzed and dissolved out in sea water.

It has surprisingly been found that for the abovesaid object, the present hydrolyzable polyester resins are ideal and that the metal content should be in the order of 0.3~10 wt%, preferably 0.6~8 wt% and most preferably 0.6~5 wt%, of the total polymer weight. If the metal content is less than the lower limit of 0.3%, the hydrolysis rate is too slow to attain the object of this invention. Whereas, if it is more than the upper limit of 10 wt%, hydrolysis rate is too fast, and it is unable to obtain a durable coating for a longer period of time. It is, of course, possible in the latter case, to attain a considerable durability, providing using a thicker coating, and however, this is undesirable from the standview of economy. Acid value and Tg of the polyester resin may somewhat bear hydrolysis effect, but they cannot be the critical conditions therefor. According to the inventor's studies, it has also been found that the polyester resin should preferably have an acid value of 2 to 80, more preferably 5 to 75, and Tg of $-10°\sim60°$ C., more preferably $-5°\sim40°$ C. and most preferably $-5°\sim25°$ C.

The present novel polyester resin thus can afford an ideal marin paint composition, whose coating is gradually hydrolyzed and dissolved out in sea water in optimum rate, while maintaining the characteristics film performance in practical use. Moreover, the metal liberated per se is useful as toxicant for marine livings.

In formulating the coating composition with the present hydrolyzable polyester resin, any of the conventional techniques may be satisfactorily used as they are. As a solvent, any of the common organic solvent may be used, including aromatic hydrocarbons (e.g. toluene, xylene), ketones (e.g. methylethyl ketone, methyl isobutyl ketone), esters (e.g. ethyleneglycol monoethyl ether acetate, butyl acetate), alcohols (e.g. butyl alcohol), ethers (e.g. 1,4-dioxane, tetrahydrofuran) and the like. However, since the solvent needs not completely dissolve the resinous material, various other solvents employed in the coating area may be satisfactorily used. If desired, the solvent can be monomer or other resinous varnish. It is of course possible to added conventional coloring matter, coating additives or the like with the composition of this invention. From the foregoing, it would be clear that one of the most attractive usages of the present polyester is the formation of ship bottom paint, and especially antifouling paint. For the economy of fuel consumption and maintenance of sailing speed, the paint can be formulated with the present resinous varnish only. However, for the antifouling purpose, it is often desired or preferred to formulate the composition with the present varnish and other antifouling agent. Such agent may be of any type customarily used for the intended object as, for example, metallic copper, copper compounds (e.g. cupric hydroxide, cuprous oxide, cuprous thiocyanate), tributyl tin compounds (e.g. bis tributyl tin oxide, tributyl tin fluoride, tributyl tin $\alpha,\alpha'$-dibromosuccinate), triphenyl tin compounds (e.g. triphenyl tin hydroxide, triphenyl tin fluoride, triphenyl tin chloride, triphenyl tin $\alpha,\alpha'$-dibromosuccinate), and sulfur compounds (e.g. tetramethylthiuram disulfide, zinc dimethyl dithiocarbamate, manganese ethylene bisdithiocarbamate, zinc ethylene bisdithiocarbamate). Of course, any of the conventional dissolving aids as, for example, rosin, may be freely added thereto.

The amounts of these materials may be selected in any desired levels, providiang giving no adverse effect on the film-forming of the resinous vehicle of the present invention. In contrast to the heretofore known antifouling paints, the present coating composition has the characteristics such that after coating, gradual hydrolysis and decomposition of the coating is occured and hence the antifouling agent conatained in the film can be effectively utilized to the last. Whereas, in the conventional type of composition, only the toxicant contained in the vicinity of film surface is utilized for the intended object through diffusion and dissolution thereof. Furthermore, in the conventional type of coating, the coating turns to skelton structure with the dissolution of antifouling agent, whereas in the present coating, in the present coating, the coating is getting smoother and flatter with sailing, and the antifouling effect continues to last for a longer period of time as compared with those of the conventional one. Thus, the antifouling paint of the present invention is quite unique and will change the established antifouling concept in near future.

The invention shall be now more fully explained in the following Examples and Comparative Examples. Unless otherwise being stated, part and % are on weight basis.

EXAMPLE 1

Into a four-necked flask equipped with reflux condenser, decanter and stirrer, were placed 100 parts of copper 12-hydroxy stearate (abbreviated as Cu 12-HO stearate), 245.5 parts of phthalic anhydride and 25 parts of toluene, and the mixture was heated to 100° C. Next, 191 parts of 1,6-hexanediol and 1 part of dibutyl tin oxide were added, the mixture was heated under nitrogen stream to 160° C. and the polycondensation reaction was continued, while removing the formed water, for 8 hours. With the progress of the reaction, the temperature of the system was getting raised and the final temperature reached to 180° C. Thereafter, toluene was removed to obtain a dark green resin having the characteristics of MW (number-average molecular weight) 1400, Tg $-5°$ C., acid value 9.7, and Cu content 1.2 wt %. 60 Parts of said resin were dissolved in 40 parts of methyl isobutyl ketone to obtain a resinous varnish (V-1). Tg was measured by using TMA-30 manufactured by Shimizu Seisakusho (hereinafter the same).

EXAMPLE 2

Using the same apparatus as stated in Example 1, were added 30 parts of xylene, 112 parts of copper 12-hydroxy stearate, 48 parts of phthalic anhydride and 70.5 parts of azelaic acid, and the mixture was heated to 100° to 110° C. and maintained at the same temperature for 30 minutes. Thereafter, 56.5 parts of neopentylglycol, 13 parts of trimethylol propane and 0.6 part of dibutyl tin oxide were added and the dehydration reaction was carried out under the same conditions as stated in Example 1. After completion of the reaction, the mixture was allowed to cool to 110° C., and added with a mixture of xylene/n-butanol (9/1) to obtain a varnish (V-2) (number-average molecular weight 4200, solid content 50.4%, viscosity N). Tg of the resin was 12° C., Cu content was 4 wt%, Sn content was 0.11 wt% and acid value was 12.

EXAMPLES 3~7

The same procedures as stated in Example 1 or 2 were repeated excepting using the materials shown in Table 1 to obtain hydrolyzable polyester resins and resinous varnishes V-3 to V-7.

The characteristics of these products are also known in Table 1.

EXAMPLE 8

The same procedures as stated in Example 1 were repeated excepting using 104 parts of Cu 12-HO stearate, 233.5 parts of phthalic anhydride, 111.5 parts of neopentylglycol and 51 parts of trimethylol ethane, to obtain a dark green resin having MW 1600, Tg 0° C., acid value 21 and Cu content 1.7 wt %. 60 Parts of thus obtained aresin were dissolved in 40 parts of xylene to obtain a resinous varnish V-8.

EXAMPLE 9

The same procedures as stated in Example 1 were repeated excepting using 21 parts of nickel lactate (in place of Cu 12-OH stearate), 264 parts of phthalic anhydride, 67 parts of neopentylglycol and 29.6 parts of trimethylol ethane.

TABLE 1

| Example No. | 3 | 4 | 5 | 6 | 7 |
| --- | --- | --- | --- | --- | --- |
| Raw materials used | | | | | |
| Cu 12-HO stearate | 31.4 | 23.1 | 28.9 | 39.6 | 35.2 |
| phthalic anhydride | | 46.5 | | | 40.2 |
| succinic anhydride | 27.3 | | 5.3 | 31.7 | |
| adipic acid | 9.3 | | 37.2 | | |
| trimethylolethane | | | 2.1 | | |
| trimethylolpropane | | 5.2 | | | |
| neopentylglycol | | 25.2 | 26.5 | | 24.6 |
| diethylene glycol | 32.0 | | | 28.7 | |
| dibutyl tin oxid | 0.2 | 0.2 | 0.2 | 0.2 | 0.2 |
| method of Example | 2 | 1 | 2 | 1 | 1 |
| varnish No. | V-3 | V-4 | V-5 | V-6 | V-7 |
| molecular weight | 1100 | 4400 | 2800 | 1200 | 1600 |
| Tg °C. | $-5$ | 15 | 10 | 8 | 5 |
| viscosity | G | P | S | H | J |
| solid % | 60.1 | 55.4 | 59.2 | 60.2 | 59.3 |
| Cu % | 3.2 | 2.3 | 2.9 | 4.0 | 3.4 |
| Sn % | 0.1 | 0.1 | 0.1 | 0.1 | 0.1 |

Since the resin contained an amount of unreacted materials, after dissolving 60 parts of said resin in 40 parts of methyl isobutyl ketone, the mixture was filtered to obtain a resinous varnish V-9. The purified resin had a yellowish green color, whose acid value was 18, molecular weight 1500, Tg 29° C. and Ni content 0.8%.

EXAMPLE 10

Into the similar reaction vessel as used in Example 1, were placed 14.4 parts of neopentyl glycol and 46.8 parts of phthalic anhydride and the mixture was heated to 110° C. Next, 19.2 parts of trimethylol ethane and 15.1 parts of 12-hydroxy stearate were added and the mixture was heated to 140° C. and maintained at the same temperature for 30 minutes. At this stage, the resinous material showed an acid value of 208. To this, were added 4.9 parts of copper hydroxide and the mixture was heated at 140° C. while removing the formed water therefrom, for 2 hours. Next, 0.5 part of dibutyl tin oxide and 5 parts of toluene were added and the mixture was refluxed, while removing the formed water, and reacted as in Example 1. After completion of the reaction, the product was diluted with a combined solvent of 15 parts of xylene and 45 parts of methyl isobutyl ketone to obtain a resinous varnish (V-10) whose solid content was 60.2% and resinous acid value was 18. The resin showed number-average molecular weight 1900, Tg 12° C., Cu content determined by atomic-absorption spectroscopy 4.0 wt % and Sn content 0.18 wt%.

EXAMPLE 11

Into the similar reaction vessel as used in Example 1, were placed 39.4 parts of phthalic anhydride, 13.3 parts of succinic anhydride, 7.1 parts of diethylene glycol, 16.6 parts of neopentyl glycol and 16.3 parts of trimethylol methane and the mixture was heated to 130° C. and maintained at the same temperature for 30 minutes. At this stage, the resinous material showed an acid value of 200. To this, were added 7.4 parts of copper hydroxide and after maintaining the temperature at 130° C. for 2 hours, the mixture was added with 4 parts of dibutyl tin oxide and 5 parts of toluene and reacted as in Example 1.

Thus obtained polyester resin showed an acid value of 20, Tg of 18° C., number average molecular weight of 1400, Cu content of 4.9 wt% and Sn content of 1.7 wt%. 60 Parts of said resin were dissolved in 30 parts of xylene and 10 parts of butanol to obtain a resinous varnish V-11.

EXAMPLE 12

To the similar reaction vessel as used in Example 1, was attached a vacuum means and added 100 parts of resinous varnish V-11, 7 parts of bis(tributyl tin oxide) and 40 parts of xylene, and the mixture was reacted at 80° C. for 30 minutes, while removing the formed water under reduced pressure azeotropically. Thus obtained varnish V-12 showed viscosity R and solid content 6.3%. It was found that the polyester resin contained had the characteristics of number-average molecular weight 1600, Tg 3° C., Cu 4.4 wt% and Sn 2.7 wt%.

EXAMPLE 13

Into the similar reaction vessel as used in Example 1, were placed 54 parts of phthalic anhydride, 31.4 parts of neopentyl glycol and 6 parts of trimethylol ethane and the mixture was heated to 140° C. and maintained at the same temperature for 30 minutes. At this stage, the resinous material showed an acid value of 218. To this, were added 8.6 parts of dibutyl tin oxide and 5 parts of toluene and the mixture was reacted as in Example 12, while removing the formed water under refluxing. Thus obtained resin showed an acid value of 15, Tg of 21° C. and number-average molecular weight of 1200 and had a pale yellow color. Sn content of the resin was 3.8 wt%. 60 Parts of the resin were added with 30 parts of xylene and 10 parts of butyl acetate to obtain a resinous varnish V-13.

EXAMPLE 14

To the similar reaction vessel as used in Example 1, were placed 52.6 parts of phthalic anhydride, 25 parts of neopentyl glycol and 5.8 parts of trimethylol ethane and the mixture was heated to 140° C. and maintained at the same temperature for 30 minutes. The acid value was found to be 228 at this stage. To this, were added 16.8 parts of dibutyl tin oxide and 5 parts of toluene and the mixture was reacted under reflux condition, while removing the formed water therefrom. Thus obtained resin had a pale yellow color and had the characteristics of acid value 10, Tg 17° C., number-average molecular weight 1800 and Sn content 8.3 wt%. A resinous varnish V-14 was prepared by adding 30 parts of xylene and 10 parts of methyl isobutyl ketone to 60 parts of said resin.

COMPARATIVE EXAMPLE 1

Preparation of Comparative Varnish 1

Following the procedures of Example 1, a comparative varnish 1 was prepared by using 58.1 parts of phthalic anhydride, 12.1 parts of neopentyl glycol, 9.6 parts of 1,6-hexanediol and 20.5 parts of tri-methylol ethane. This varnish had a solid content of 50.4%, Gardner viscosity of P and acid value of solid of 9.7.

COMPARATIVE EXAMPLE 2

(Comparative Varnish 2)

Following the procedures of Example 1, a comparative varnish 2 was prepared from 54.9 parts of phthalic anhydride and 50.1 parts of 1,6-hexanediol. This varnish had a solid content of 65.3%, Gardner viscosity of J and acid value of solid of 9.7.

COMPARATIVE EXAMPLE 3

(Comparative Varnish 3)

Into a solution of 50 parts of methyl methacrylate and 50 parts of tributyl tin methacrylate in 100 parts of toluene, were added dropwsie an initiator solution containing 0.8 part of benzoylperoxide at 90° C. over 3 hours, to obtain a varnish having the solid content of 50.4% and Gardner viscosity of N. This is not of polyester type, but is well-known hydrolyzable acrylic resin, and therefore, it was prepared just for comparison sake herein.

COMPARATIVE EXAMPLE 4

(Comparative Varnish 4)

Into the similar reaction vessel, were added 58.4 parts of phthalic anhydride, 39.5 parts of neopentyl glycol and 1.7 parts of trimethylol ethane and the mixture was heated to 140° C. and maintained at the same temperature for 30 minutes. To this, were added 0.4 part of dibutyl tin oxide and 5 parts of toluene and the mixture was reacted under reflux condition as in Example 12 to obtain a resin having an acid value of 0.8, number-average molecular weight of 1700, Sn% of 0.18 wt% and Tg of 24° C. 60 Parts of this resin were dissolved in a combined mixture of 30 parts of xylene and 10 parts of methyl isobutyl ketone to obtain a comparative resinous varnish 4.

COMPARATIVE EXAMPLE 5

(Comparative Resinous Varnish 5)

Into the similar reaction vessel as used in Example 1, were placed 47.5 parts of phthalic anhydride, 10.1 parts of neopentyl glycol and 12.1 parts of trimethylol ethane and the mixture was heated to 140° C. and maintained at the same temperature for 30 minutes. To this, were added 30.3 parts of dibutyl tin oxide and 5 parts of toluene and the mixture was reacted under reflux condition as in Example 1 to obtain a pale yellow resin having an acid value of 20, Tg of 11° C. and number average molecular weight of 1400. Sn content of this resin was 15.4 wt%. 60 Parts of this resin were dissolved in a combined mixture of 30 parts of xylene and 10 parts of methyl isobutyl ketone to obtain a comparative resinous varnish 5.

In order to demonstrate the fact that the coating derived from the present varnish can be gradually hydrolyzed and dissolved out under alkaline conditions, the following tests were conducted.

Onto a glass plate (60 mm × 50 mm), was applied the respective varnish obtained so as to give about 100μ dry thickness, heated at 105° C. for 3 hours and measured the total weight (this was used as initial weight). Thereafter, the glass plate was dipped into 350 cc of an aqueous alkaline solution (pH 10) and maintained therein at 40° C. for 28 days. The glass plate was then taken out of the bath, washed with water, dried and weighed again (this was used as final weight). Hydrolysis rate was calculated from the following:

$$\text{Hydrolysis rate (1)} = \frac{\text{initial weight} - \text{final weight}}{\text{initial weight}}$$

$$\text{Hydrolysis rate (2)} = \frac{\text{initial weight} - \text{final weight}}{\text{period (day)} \times \text{area (6} \times \text{5)}}$$

The test results are shown in the following Table 2.

TABLE 2

|      | initial wt. mg | final wt. mg | hydrolysis rate (1) | hydrolysis rate (2) |
|------|------|------|------|------|
| V-1  | 484 | 329 | 0.32 | 184 |
| V-2  | 462 | 318 | 0.31 | 171 |
| V-3  | 476 | 324 | 0.32 | 181 |
| V-4  | 493 | 453 | 0.08 | 48 |
| V-5  | 504 | 432 | 0.14 | 86 |
| V-6  | 476 | 334 | 0.30 | 169 |
| V-7  | 437 | 314 | 0.28 | 146 |
| V-8  | 485 | 423 | 0.12 | 74 |
| V-9  | 477 | 446 | 0.06 | 37 |
| V-10 | 452 | 305 | 0.33 | 175 |
| V-11 | 487 | 317 | 0.35 | 202 |
| V-12 | 508 | 317 | 0.38 | 227 |
| V-13 | 461 | 340 | 0.26 | 144 |
| V-14 | 470 | 263 | 0.44 | 246 |
| C-1  | 491 | 489 | 0.004 | 2.4 |
| C-2  | 474 | 472 | 0.004 | 2.4 |
| C-3  | 488 | 409 | 0.16 | 94 |
| C-4  | 462 | 455 | 0.015 | 8.3 |
| C-5  | 482 | 127 | 0.74 | 427 |

EXAMPLES 15~30 AND COMPARATIVE EXAMPLES 6~10

Using the resinous varnishes V-1~V-14, C-1~C-5 and following the prescriptions given in the following Table 3, antifouling paints were prepared, respectively.

Onto a sand-blasted steel plate previously coated with an anticorrosive paint, the respective coating composition was applied twice by brushing so as to give a coating of about 100μ dry thickness. The following tests were carried out with these plates.

Antifouling test and result

The test plates were immersed in sea water for a defined period of time and the antifouling effects were determined. This test was conducted at Aioi Bay, Hyogo Pref. The results are shown in Table 4.

Erosive dissolution test and result

Test plate having a defined thickness of coating was attached to Discrotor, immersed in sea water (18° to 23° C.) and rotated at a constant speed (peripheral speed 35 knots) for 1 year (days and nights). Use-up rate of the coating was determined microscopically.

The results are shown in Table 5.

$$\text{Use-up rate (1)} = \frac{\text{initial film thickness} - \text{film thickness after test}}{\text{initial film thickness}}$$

$$\text{Use-up rate (2)} = \frac{\text{initial film thickness} - \text{film thickness after test}}{\text{period}}$$

From the foregoing, it may be very clear that the present antifouling paint has an excellent polishing effect.

TABLE 3

Prescription of antifouling paint (weight %)

| | Example | | | | | | |
|---|---|---|---|---|---|---|---|
| | 15 | 16 | 17 | 18 | 19 | 20 | 21 |
| res. varnish V-1 | 45 | | | | | | |
| V-2 | | 40 | | | | | |
| V-3 | | | 35 | 50 | | | |
| V-4 | | | | | 40 | 40 | |
| V-5 | | | | | | | 35 |
| WW rosin | | | | | | | |
| vinyl chloride resin VYHH | | | | | | | |
| dioctyl phthalate | | | | | | | |
| cuprous oxide | 35 | 25 | 10 | | 35 | | 35 |
| cuprous thiocyanate | | | | | | 20 | |
| MANEB | | | | 5 | 5 | | |
| ZINEB | | | 8 | 5 | 5 | | |
| triphenyl tin hydroxide | 5 | | 10 | 5 | | 5 | 10 |
| triphenyl tin chloride | | | | | | | |
| triphenyl tin fluoride | | | | 10 | | 5 | |
| ZDMC | | | | | | | |
| TMT | | | | | | | |
| colcothar | 5 | 5 | 5 | | 5 | | 5 |
| zinc white | | 20 | 20 | 10 | | 15 | |
| methyl isobutyl ketone | 5 | | | | | | |
| xylene | 5 | 10 | 12 | 15 | | 15 | 15 |
| white spirit | | | | | 10 | | |
| total | 100 | 100 | 100 | 100 | 100 | 100 | 100 |

| | Example | | | | | | |
|---|---|---|---|---|---|---|---|
| | 22 | 23 | 24 | 25 | 26 | 27 | 28 |
| res. varnish V-6 | 45 | | | | | | |
| V-7 | | 45 | | | | | |
| V-8 | | | 60 | | | | |
| V-9 | | | | 45 | | | |
| V-10 | | | | | 40 | | |
| V-11 | | | | | | | 40 |

TABLE 3-continued

| Prescription of antifouling paint (weight %) | | | | | | |
|---|---|---|---|---|---|---|
| V-12 | | | | | | 45 |
| WW rosin | | | | | | |
| vinyl chloride resin VYHH | | | | | | |
| dioctyl phthalate | | | | | | |
| cuprous oxide | | 25 | | 30 | 40 | 40 | 40 |
| cuprous thiocyanate | | | | | | |
| MANEB | | | | 5 | | | 5 |
| ZINEB | | | 5 | | | | |
| triphenyl tin hydroxide | 5 | | | | | |
| triphenyl tin chloride | | | | | | |
| triphenyl tin fluoride | 10 | 5 | 10 | | | | |
| ZDMC | 10 | | | | | | |
| TMT | 5 | | | | | | |
| colcothar | | | | 5 | 5 | 5 | 5 |
| zinc white | 15 | 15 | 20 | | | | |
| methyl isobutyl ketone | | 5 | 5 | 5 | 5 | 5 |
| xylene | 10 | 10 | 10 | 10 | 10 | 10 |
| white spirit | | | | | | |
| total | 100 | 100 | 100 | 100 | 100 | 100 | 100 |

| | Example | | Comparative Example | | | | |
|---|---|---|---|---|---|---|---|
| | 29 | 30 | 6 | 7 | 8 | 9 | 10 |
| res. varnish V-13 | 45 | | | | | | |
| V-14 | | 40 | | | | | |
| C-1 | | | 55 | | | | |
| C-3 | | | | 50 | | | |
| C-4 | | | | | 45 | | |
| C-5 | | | | | | | 40 |
| WW rosin | | | 7 | | | | |
| vinyl chloride resin VYHH | | | 7 | | | |
| dioctyl phthalate | | | 2 | | | | |
| cuprous oxide | 40 | 35 | 35 | 35 | 35 | 40 | 40 |
| cuprous thiocyanate | | | | | | | |
| MANEB | | 5 | | | | | 5 |
| ZINEB | 5 | | | 5 | | 5 | |
| triphenyl tin hydroxide | | | | 5 | | | |
| triphenyl tin chloride | | | | | | | |
| triphenyl tin fluoride | | | | 3 | 5 | | 5 |
| ZDMC | | | | | | | |
| TMT | | | | | | | |
| colcothar | 5 | 5 | 10 | 5 | 5 | 5 | 5 |
| zinc white | | 10 | | | | | |
| methyl isobutyl ketone | 5 | 5 | 15 | | | 5 | 5 |
| xylene | | | 16 | | 10 | | |
| white spirit | | | | | | | |
| total | 100 | 100 | 100 | 100 | 100 | 100 | 100 |

TABLE 4

| Antifouling test (surface area % adhered with submarine livings) | | | | | | | |
|---|---|---|---|---|---|---|---|
| immersed months | 3 | 6 | 9 | 12 | 18 | 24 | 30 |
| Exam. 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 21 | 0 | 0 | 0 | 0 | 0 | 0 | 5 |
| 22 | 0 | 0 | 0 | 0 | 0 | 0 | 0 |
| 23 | 0 | 0 | 0 | 0 | 0 | 0 | 0 |
| 24 | 0 | 0 | 0 | 0 | 0 | 0 | 0 |
| 25 | 0 | 0 | 0 | 0 | 0 | 5 | 10 |
| 26 | 0 | 0 | 0 | 0 | 0 | 0 | 0 |
| 27 | 0 | 0 | 0 | 0 | 0 | 0 | 0 |
| 28 | 0 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |
| Comp. Exam. 6 | 0 | 0 | 0 | 5 | 80 | 100 | 100 |
| 7 | 0 | 0 | 5 | 20 | 80 | 100 | 100 |
| 8 | 0 | 0 | 0 | 0 | 5 | 20 | 60 |
| 9 | 0 | 0 | 0 | 5 | 70 | 100 | 100 |
| 10 | 0 | 0 | 0 | 0 | 100* | 100* | 100* |

*anticorrosive coating was exposed because of the complete solution of the anticorrosive coating

TABLE 5

| | | Coating use-up rate | | | |
|---|---|---|---|---|---|
| | | initial film thick. | film thick. after 1 yr. | use-up rate (1) | use-up rate (2) |
| Exam. | 15 | 210μ | 145μ | 0.31 | 65μ |
| | 16 | 220 | 165 | 0.25 | 55 |
| | 17 | 190 | 110 | 0.42 | 80 |
| | 18 | 220 | 140 | 0.36 | 80 |
| | 19 | 210 | 190 | 0.10 | 20 |
| | 20 | 210 | 180 | 0.13 | 30 |
| | 21 | 190 | 155 | 0.18 | 35 |
| | 22 | 230 | 145 | 0.37 | 85 |
| | 23 | 190 | 125 | 0.34 | 65 |
| | 24 | 220 | 200 | 0.09 | 20 |
| | 25 | 210 | 200 | 0.05 | 10 |
| | 26 | 230 | 165 | 0.28 | 65 |
| | 27 | 190 | 130 | 0.32 | 60 |
| | 28 | 240 | 160 | 0.33 | 80 |
| | 29 | 200 | 150 | 0.25 | 50 |
| | 30 | 220 | 130 | 0.41 | 90 |
| Comp. Exam. | 6 | 200 | 200 | 0 | 0 |
| | 7 | 220 | 220 | 0 | 0 |
| | 8 | 190 | 150 | 0.21 | 40 |
| | 9 | 210 | 205 | 0.02 | 5 |
| | 10* | 230 | 35 | 0.91 | 420 |

*result after 6 months (since the coating was wholly dissolved out after 9 months)

What is claimed is:

1. Hydrolyzable polyester resin for an antifouling paint use having at least one metal-ester bondings, the metal being at least one member selected from the Groups Ib, IVa and VIII of the Periodic Table.

2. The resin according to claim 1 wherein the metal is selected from Cu, Ni and Sn.

3. The resin according to claim 1 which is further characterized by having hydrolysis rate at 40° C. in alkaline solution (pH 10) of 10~300 μg/cm² day, and metal content of 0.3~10 wt %.

4. Antifouling paint composition comprising a hydrolyzable polyester resin having at least one metal-ester bondings, the metal being at least one member selected from the Groups Ib, IVa and VIII of the Periodic Table and an antifouling agent selected from the group consisting of metallic copper, cupric hydroxide, cuprous oxide, cuprous thiocyanate, bis-tributyl tin oxide, tributyl tin fluoride, tributyl tin α,α'-dibromosuccinate, triphenyl tin hydroxide, triphenyl tin fluoride, triphenyl tin chloride, triphenyl tin α,α'-dibromosuccinate, tetramethylthiuram disulfide, zinc dimethyl dithiocarbamate, manganese ethylene bisdithiocarbamate and zinc ethylene bisdithiocarbamate.

* * * * *